United States Patent [19]

Kadokura et al.

[11] Patent Number: 4,958,249
[45] Date of Patent: Sep. 18, 1990

[54] MAGNETIC RECORDING DISK CARTRIDGE

[75] Inventors: Sadao Kadokura, Hachioji; Kazuhiro Kamei; Yoshihisa Watamura, both of Hino, all of Japan

[73] Assignee: Teijin Limited, Osaka, Japan

[21] Appl. No.: 220,272

[22] Filed: Jul. 18, 1988

[30] Foreign Application Priority Data

Jul. 16, 1987 [JP]  Japan .............................. 62-175981
Sep. 22, 1987 [JP]  Japan .............................. 62-236303

[51] Int. Cl.$^5$ ............................................. G11B 23/03
[52] U.S. Cl. ..................................................... 360/133
[58] Field of Search ......................................... 360/133

[56] References Cited

U.S. PATENT DOCUMENTS 4,630,728  12/1986  Matsumoto ..................... 360/133 X
4,789,916  12/1988  Oishi .
4,797,770   1/1989  Takahasi ......................... 360/133 X

FOREIGN PATENT DOCUMENTS 0137310  4/1985  European Pat. Off. .
0209892  1/1987  European Pat. Off. .
3525412  1/1986  Fed. Rep. of Germany .

OTHER PUBLICATIONS

Search Report from the European Patent Office.

Primary Examiner—A. J. Heinz
Attorney, Agent, or Firm—Sughrue, Mion, Zinn, Macpeak & Seas

[57] ABSTRACT

A magnetic recording disk cartridge includes a casing having upper and lower halves mated together to define a planar spacing in which a magnetic recording disk supported by a hub member is rotatably held, and fluctuation suppressing ring members are disposed within the casing to be axially spaced from one another via at least an outer peripheral portion of the magnetic recording disk. The fluctuation suppressing ring members aerodynamically maintain the magnetic recording disk at an intermediate position in the planar spacing of the casing during the rotation of the magnetic recording disk.

25 Claims, 8 Drawing Sheets

Fig. 9A
(PRESENT INVENTION)

Fig. 9B
(CONTROL)

Fig. 10 A
PRIOR ART

Fig. 10 B
PRESENT INVENTION

Fig. 13

MAGNETIC RECORDING DISK CARTRIDGE

BACKGROUND OF THE INVENTION

1. Field of the Invention

The present invention relates to a magnetic recording disk cartridge provided with a rigid casing encasing therein a rotatable flexible magnetic recording disk having a spiral track or concentric circular tracks formed thereon in which information is written and read by a recording and retrieving head through a head window formed at a predetermined position of the casing. More particularly, the present invention relates to a magnetic recording disk cartridge provided with a casing able to encase therein a metallic thin film type magnetic disk having, e.g., a thin Co system alloy film with a high magnetic recording density, and enables a high speed access, a high durability, and a high reliability.

2. Description of the Related Art

In the magnetic recording disk cartridge accommodating therein a magnetic recording disk having a high magnetic recording density, fine dust and fingerprints on and damage mechanically applied to the surface of the magnetic recording disk adversely affect the recording performance of the magnetic recording disk, and therefore, the magnetic recording disk is encased in a portable casing to cover the magnetic recording disk. The recording and retrieving of information is carried out by a magnetic recording and retrieving head through a head window provided at a predetermined position of the casing of the magnetic recording disk cartridge.

Japanese Unexamined Patent Publication No. 57-212669 discloses an improved magnetic recording disk cartridge provided with a closing member or a shutter to close a head window of the cartridge, to prevent dust and fingerprints impinging on the magnetic recording disk surface through the head window, as well as to protect the magnetic recording disk surface from being damaged via the head window. The cartridge of the Japanese Unexamined Patent Publication No. 57-212669 is constructed in such a manner that the head window is opened only when the magnetic recording disk cartridge is set in a magnetic recording disk drive unit, and is automatically closed by the shutter when the magnetic recording disk cartridge is taken out of the drive unit. The improved magnetic recording disk cartridge of the Japanese Unexamined Patent Publication No. 57-212669 enhances the reliability of a safe storage of a magnetic recording disk and a safe insertion of the magnetic recording disk cartridge into a magnetic recording disk drive unit, and therefore, when the improved construction of the Japanese Unexamined Patent Publication No. 57-212669 is applied to a magnetic recording disk cartridge incorporating therein a coating type flexible magnetic recording disk coated with a magnetic recording medium, such as a $\gamma$-$Fe_2O_3$, the cartridge can be used without the occurrence of any particular technical problem.

On the other hand, Japanese Unexamined Patent Publications No. 52-134706 and No. 53-3209 disclose a thin film type magnetic recording medium employing a magnetic thin film capable of exhibiting a high recording density which cannot be expected by the abovementioned coating type magnetic recording medium, to satisfy a requirement for increasing the density of recording and retrieving information. These Publications No. 52-134706 and No. 53-3209 also discloses a perpendicular magnetic recording and retrieving mechanism by which a high speed accessibility and highly precise recording are realized and a retrieving mechanism used with the above-mentioned thin film type magnetic recording medium.

Nevertheless, when a conventional cartridge casing for the conventional coated type magnetic recording disk is directly used for encasing the abovementioned thin film type flexible magnetic recording disk having on the face thereof a magnetic recording medium made of a strong magnetic metal film or a metallic oxide film, it has been found that a serious defect arises from the viewpoint of the performance of a magnetic recording disk cartridge. Namely, a nonwoven cloth liner of the conventional cartridge casing arranged to be in sliding contact with the face of the coating type magnetic recording disk, to thereby promote a smooth and stable rotation of the coated type magnetic recording disk and prevent dust on the recording face or the observe face of the disk, cannot properly exhibit these functions with the respect to the afore-mentioned thin film type flexible magnetic recording disk. This is because, as the face of the thin film type flexible magnetic recording disk is generally covered with a protective layer made of a metallic oxide layer or a thin carbon layer, the face becomes harder than that of the conventional coating type flexible magnetic recording disk, and as a result, when the above-mentioned nonwoven-cloth liner of the conventional cartridge casing is arranged to be in sliding contact with the face of the thin film type flexible magnetic recording disk, the liner is abraded to generate a collection of abraded fine materials intervening between the face of the magnetic recording disk and a magnetic recording and retrieving head when the cartridge is used with the magnetic disk drive unit. Therefore, either the face of the flexible magnetic recording disk and the end face of the magnetic recording and retrieving head are damaged or a small spacing appears between the face of the flexible magnetic recording disk and the end face of the magnetic recording and retrieving head to prevent an appropriate magnetic recording and retrieving operation, and thus a reliable recording and retrieving operation cannot be obtained from the combination of the thin film type magnetic recording disk and the conventional cartridge casing with the nonwoven cloth liner. In addition, it has been found that, even if a fine adjustment of the sliding contact between the nonwoven cloth liner and the thin film type flexible magnetic recording disk is made, a rotating torque detected during the rotation of the disk is greatly different among different thin film type flexible magnetic recording disks, and therefore, it is difficult to realize a reliable magnetic disk drive system when the conventional nonwoven cloth liner is used for a cartridge of the thin film type flexible magnetic recording disk.

Japanese Unexamined Patent Publication No. 62-33385, to the present inventors at al., discloses a novel casing for a magnetic recording disk cartridge capable of overcoming the above-mentioned difficulty. The casing of the cartridge disclosed in the Japanese Unexamined Patent Publication No. 62-33385 has a plurality of hard projections made of a sliding material, to replace the conventional nonwoven cloth liner. The hard projections of the casing are arranged to confront a peripheral portion of each face of the magnetic recording disk encased in the casing and are circumferentially spaced apart from one another. It was confirmed that the operational life of the magnetic recording disk cartridge with the hard projections has been prolonged while overcoming the above-mentioned difficulty. But, during subsequent research and experiments by the present inventors, it was found that sometimes disturbances appear in the wave form of the retrieving signal retrieved by a magnetic retrieving head from the thin film type magnetic recording disk, and accordingly, errors in the retrieving of information from the magnetic recording disk occur. Therefore, the present inventors conducted further investigations to detect the cause of the above-mentioned errors. At this stage, it should be appreciated that, since the flexible magnetic recording disk must be rotated in the casing of the cartridge without fluctuating with respect to a flat plane, to achieve a stable recording and retrieving of information on the face of the thin film type flexible magnetic recording disk, when the magnetic recording disk cartridge is rotated by a disk drive unit about a rotating axis of the cartridge, fluctuation of the face of the magnetic recording disk is suppressed to less than a predetermined value by reducing a distance between the ends of the hard projections and the face of the flexible magnetic recording disk. Nevertheless, it was found that the above-mentioned small distance left between the ends of the hard projections and the face of the flexible magnetic recording disk causes the aforementioned retrieving errors.

SUMMARY OF THE INVENTION

An object of the present invention is to eliminate the defect encountered by the conventional casing of the cartridge for a thin-film type magnetic recording disk as disclosed in the Japanese Unexamined Patent Publication No. 62-33385.

Another object of the present invention is to provide a magnetic recording disk cartridge having a casing which encases therein a thin-film type flexible magnetic recording disk with a magnetic recording and retrieving layer consisting of a metallic magnetic thin-film and is able to guarantee a long and reliable operation life of the magnetic recording disk cartridge.

A further object of the present invention is to provide a magnetic recording disk cartridge provided with a casing adapted for rotatably mounting therein a flexible magnetic recording disk so that the disk can be rotated by a small drive torque over a wide speed range of from 300 r.p.m. to 4,000 r.p.m.

A still further object of the present invention is to provide a rigid casing adapted for a magnetic recording disk cartridge incorporating therein a thin-film type magnetic recording disk.

In accordance with the present invention, there is provided a magnetic recording disk cartridge which comprises:

a rigid casing means having first and second inner faces confronting one another, and a planar spacing defined between the first and second inner faces;

a magnetic recording disk encased in the planar spacing of the rigid casing means and rotatable about an axis perpendicular to the first and second inner faces of the rigid casing means; and a stationary ring-form means for maintaining the magnetic recording disk at an axially middle position of the planar spacing of the rigid casing means when the magnetic recording disk is rotated in the planar spacing, the stationary ring-form means being made of a sliding material and comprising at least a pair of first and second rings arranged within the rigid casing means to confront at least an outer peripheral portion of the magnetic recording disk from both sides thereof, to thereby suppress a fluctuation of the magnetic recording disk during the rotation thereof.

Preferably, the stationary ring-form means further comprises another pair of third and fourth rings arranged within the rigid casing means to confront an inner peripheral portion of the magnetic recording disk from both sides thereof The ring-form means made of a sliding material causes an aerodynamic action of an air in a zone where the first and second rings confront the outer peripheral portion of the disk during the rotation of the magnetic recording disk, so that a fluctuation of the magnetic recording disk is suppressed within a limited fluctuation amount, and therefore, not only can an appropriate recording and retrieving of information on the disk be achieved but also a long life of operation of the magnetic recording disk longer than that of the disk encased in the conventional casing provided with the hard projections or pads can be ensured.

According to the above-mentioned magnetic recording disk cartridge of the present invention, when the magnetic recording disk is rotated in the rigid casing means relative to the stationary ring-form means, the disk is aerodynamically maintained to be always positioned intermediately in the spacing defined between the confronting inner faces of the rigid casing means, and a fluctuation of the disk during the rotation thereof is limited to a predetermined amount determined by at least the pair of first and second rings of the ring-form means. As the ring-form means, different from the conventional nonwoven cloth liner, does not come into sliding contact with the overall faces of the magnetic recording disk during the rotation of the disk, the problem due to the abraded material of the conventional cloth liner does not occur, and accordingly, the magnetic recording and retrieving face or faces are not damaged by dust and other foreign materials. In addition, since the stationary ring-form means does not come into sliding contact with the overall faces of the magnetic recording disk during the rotation of the disk, the magnetic recording disk can be rotated by small drive torque.

Since the stationary ring-form means is arranged and constructed to urge the magnetic recording disk to be rotated in a plane located intermediately in a planar spacing extending between the inner faces of the rigid casing means, each of the first through fourth rings of the ring-form means is preferably formed as a continuously and annularly extending member made of a sliding material. Nevertheless, each ring may have a slit or cut to permit air to flow therethrough as required. Further, each of the first through fourth rings of the stationary ring-form means preferably has a rounded end slidably confronting the face of the magnetic recording disk at the outer or inner peripheral portion of the disk. Preferably, a radius of curvature of the rounded end of the ring is equal to or more than 50 mm; the outer end of the ring should be flattened, from the view point of mechanical durability.

Preferably, the stationary ring-form means arranged within the rigid casing means is located adjacent to either the outer peripheral portion or both outer and inner peripheral portions of the magnetic recording disk, from the viewpoint of a stable support of the disk in the rigid casing means. Further, the ring-form means should be located in such a manner that it does not come into sliding contact with a recording and retrieving area of the face or faces of the magnetic recording disk. The first and second rings and the third and fourth rings of the ring-form means are preferably arranged to axially confront one another via the magnetic recording disk, respectively, to provide the disk with a stable support during the rotation of the magnetic recording disk.

The spacings between the first and second rings and between the third and fourth rings are determined depending on a permissible amount of fluctuation of the magnetic recording disk during the rotation of the disk; i.e., is designed in response to a change in a requirement for accuracy of the magnetic recording disk cartridge per se. But, generally, the above-mentioned spacing of the rings is selected in such a manner that, when the magnetic recording disk is assembled in the rigid casing means, a small gap appears between the end of the each ring and the face of the disk.

A material used for the stationary ring-form means according to the present invention should exhibit a good sliding property and a good abrasion-resistant property to the magnetic recording disk. This is because the aerodynamic operation to be carried out by the ring-form means during the rotation of the magnetic recording disk in the rigid casing means of the magnetic recording disk cartridge is similar to that of the conventional flying type magnetic recording head. Therefore, either the conventional materials used for producing the flying type magnetic head or a commercially available sliding material may be used for producing the stationary ring-form means. When the magnetic recording disk is a thin-film type magnetic recording disk with a protective layer made of especially a metallic oxide film, the face of the disk is very hard, and therefore, the material of the ring-form means is preferably a hard ceramics or an appropriate material, such as plastics covered with high hardness ceramics having a Vickers hardness of more than 1,000, by sputtering, ionic plating or chemical vapor deposition (CVD).

These hard ceramics may be an alumina system ceramics including $Al_2O_3$, $Al_2O_3$-TiC, $Al_2O_3$-TiO$_2$, $Al_2O_3$-TiB$_2$, $Al_2O_3$-ZrO$_2$, $Al_2O_3$-TaN, and $Al_2O_3$-Fe$_2O_3$-TiC, TiC, a titanic system ceramics including TiC, TiN, and TiC-TiN, a silicic system ceramics including SiC, SiC-Si, Si$_3$N$_4$, and SiAlN, a zirconium system ceramics including $ZrO_2$, and $ZrO_2$-SiO$_2$, and other hard thin films prepared by PVD or CVD, such as AlN film, WC film, glassy carbon film, SiAlNx film, SiCx film, SiNx film, and a carbon film. Also, the sliding material of the ring-form means may be a carbonic system composite material or a fluorine system composite material, which is preferable from the view point of causing no appreciable abrasion of the magnetic recording disk.

Each of the first through fourth rings of the stationary ring-form means may be a separate member secured to the rigid casing means by an appropriate adhesive. Alternatively, each ring may be formed integrally with the rigid casing means, and coated with a suitable sliding material.

The rigid casing means may be made of a plastics similar to that used for forming the conventional rigid plastic casing for encasing a 3.5 inch magnetic microfloppy disk, and may be produced by a forming method using forming or molding dies. When the casing means is made of a plastics by the forming method, the aforementioned first through fourth rings of the ring-form means according to the present invention may be integrally formed, and subsequently, the integrally formed rings coated with a thin-film of the above-mentioned sliding material, such as a glassy or diamond-like carbon layer, an SiC film, and a TiN film, by sputtering. The thickness of the sputtered film is approximately 0.01 to 0.1 micrometer. Thus, the rigid casing means with the integral ring-form means for suppressing fluctuation of the rotating magnetic recording disk can be produced so that a predesignated spacing is accurately obtained between the confronting rings, at a high rate of productivity. In the predetermined amount of spacing between the confronting rings of the ring-form means, a flow of air is generated during the rotation of the magnetic recording disk, which air flow makes it possible to aerodynamically maintain the magnetic recording disk intermediately in the spacing of the ring-form means, and as a result, the magnetic recording disk can avoid constant contact with the ring-form means, and therefore, a long operation life of both the magnetic recording disk and the ring-form means can be obtained.

BRIEF DESCRIPTION OF THE DRAWINGS

The above and other objects, features and advantages of the present invention will be made apparent from the ensuing description of embodiments with reference to the a drawings wherein.

DESCRIPTION OF THE PREFERRED EMBODIMENTS

Figure 1:
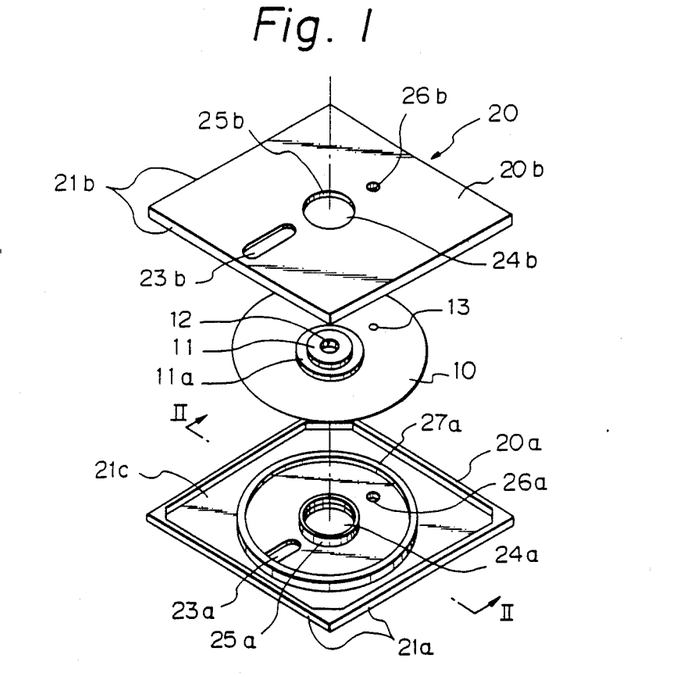
FIG. 1 is an exploded view of a magnetic recording disk cartridge according to a first embodiment of the present invention.
Figure 2:
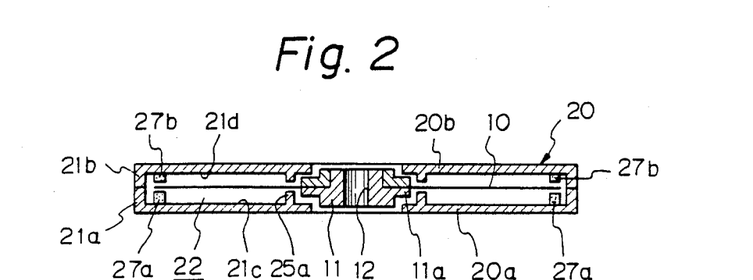
FIG. 2 is a cross sectional view taken along the line II—II of FIG. 1.

Referring to FIGS. 1 and 2, the magnetic recording disk cartridge according to the first embodiment of the present invention includes a rigid casing 20 comprised of a lower half 20a and an upper half 20b made of plastics by the forming method, and a magnetic recording disk 10. The lower half 20a and the upper half 20b are formed in a substantially square casing, and have four side walls 21a and 21b, respectively, which rise from respective flat inner faces 21c and 21d and enclose the magnetic recording disk 10. The inner constructions of the lower and upper halves 20a and 20b are substantially the same, and when the lower and upper halves 20a and 20b are mated together, a closed planar spacing 22 for rotatably encasing the magnetic recording disk 10 is formed between the confronting inner faces 21c and 21d. The magnetic recording disk 10 is supported at the center thereof by a hub member 11 having a central spindle hole 12 in which a drive shaft of a magnetic disk drive unit (not shown) is inserted. Therefore, the magnetic recording disk 10 and the hub member 11 are rotated together about an rotating axis passing through the center of the central spindle hole 12, when driven. The hub member 11 has annular steps 11a on both sides, to enable the hub member 11 to be seated between the lower and upper halves 20a and 20b, as best illustrated in FIG. 2, and therefore, the magnetic recording disk 10 is permitted to move by limited amounts in the radial and axial directions. Accordingly, the magnetic recording disk 10 is rotatably held in the casing 20 without being subjected to an unfavorable force when the disk 10 is set in the magnetic disk drive unit. The lower and upper halves 20a and 20b of the casing 20 are provided with radially elongated through-holes 23a and 23b used as head windows for permitting a magnetic recording-/retrieving head (not illustrated) to approach the magnetic recording disk 10 and to move radially for reading and retrieving information on the disk 10. The lower and upper halves 20a and 20b are provided with annular bosses 25a and 25b at the center thereof, and central hub bores 24a and 24b coaxial with the annular bosses 25a and 25b. Therefore, the hub member 11 of the magnetic recording disk 10 is fitted in the annular bosses 25a and 25b so that the magnetic recording disk is smoothly rotated when driven. The inner faces 21c and 21d of the lower and upper halves 20a and 20b of the casing 20 are provided with small through-holes 26a and 26b which are used for detecting an index hole 13 of the disk 10.

Ring members 27a and 27b having a continuous annular shape with a radial width of 1 through 10 mm, preferably 2 through 7 mm, are attached to the inner faces 21c and 21d of the lower and upper halves 20a and 20b of the casing 20 for suppressing fluctuation of the magnetic recording disk 10 during the rotation of the magnetic recording disk 10 in the casing 20. These ring members 27a and 27b are disposed to confront both faces of the magnetic recording disk 10 at an outer peripheral portion of the disk 10, i.e., the outer peripheral portion of the magnetic recording disk 10 is intervened between facing ends of the ring members 27a and 27b. Although not illustrated in FIGS. 1 and 2, the facing ends of both ring members 27a and 27b are preferably rounded.

The ring members 27a and 27b are made of a material having a required durability against a sliding contact with the magnetic recording disk 10. Therefore, the ring members 27a and 27b are made of, for example, materials used for producing the slider of a conventional magnetic head. More specifically, the ring members 27a and 27b are made of a material which might be abraded when in sliding contact with the magnetic recording disk 10 but does not cause a collection of abraded particles or powders or an abrasion of the faces of the magnetic recording disk 10. Taking this into consideration, when the magnetic recording disk 10 is a thin-film type magnetic recording disk having a metallic magnetic film on the faces thereof as a recording layer, the ring members 27a and 27b are preferably coated with a protective layer made of a carbon.

The shape of the ring members 27a and 27b is closely related to a physical property of these ring members 27a and 27b when in sliding contact with the magnetic recording disk 10. Namely, it was experimentarily confirmed that, when the facing ends of these ring members 27a and 27b have a round cross section taken along a plane perpendicular to the running direction of the magnetic recording disk 10, and when the radius of curvature of the round section is equal to or more than 50 mm, the abrasion of the ring members 27a and 27b is very small. It was also confirmed that the faster the rotating speed of the magnetic recording disk 10, the smaller the abrasion of the ring members 27a and 27b.

As illustrated in FIG. 2, preferably the ring members 27a and 27b are disposed to confront one another via the outer peripheral portion of the magnetic recording disk 10. The spacing between the confronting ends of the ring members 27a and 27b is determined depending on a permissible amount of fluctuation of the magnetic recording disk 10 from the flat plane during the rotation thereof. Generally, the ring members 27a and 27b are designed in such a manner that the height of each of the ring members 27a and 27b is sufficient to prevent the rotating magnetic recording disk 10 from coming into contact with any part of the inside of the lower and upper halves 20a and 20b of the casing 20, and that the spacing between the confronting ends of the ring members 27a and 27b enables the generation of an air gap between each face of the disk 10 and the facing end of each of the ring members 27a and 27b, the amount of which gap corresponds to a permissible amount of fluctuation of the rotating magnetic recording disk 10. The extent of the air gap is determined by the cross sectional shape of the facing ends of the ring members 27a and 27b, the physical property of the magnetic recording disk 10, and a flow of air generated by the rotation of the disk 10. Preferably, the extent of the air gap is experimentarily determined depending on a permissible amount of fluctuation of the magnetic recording disk 10 during the rotation thereof. To increase an aerodynamic effect of the flow of air in the above-mentioned air gap, appropriate slits may be formed in the facing ends of the ring members 27a and 27b.

A description of the results of a test conducted to confirm the operational effects of the magnetic recording disk cartridge provided with the casing 20 and the ring members 27a and 27b according to the first embodiment will be provided hereinbelow with reference to FIGS. 5 and 6, in addition to FIGS. 1 and 2.

First, the upper and lower casings of a conventional 3.5 inch floppy disk cartridge available on the market were used for preparation of the afore-mentioned casing 20 with upper and lower halves 20b and 20a. The inner faces of the upper and lower casings of the conventional cartridge were made flat by machining, and the liners and lifters were removed, and thus upper and lower casings substantially corresponding to those shown in FIG. 1 were obtained.

Subsequently, ring members were prepared by using a commercially available sliding material, i.e., a 0.48 mm thick slide plate manufactured and sold by the Norton Co. Ltd., of the United States under the trade name of METALLOPLASTO, and made of a copper grid coated with polytetrafluoroethylene and graphite. Ring members having an inner diameter of 72 mm and an outer diameter of 86 mm (radial width: 7 mm) were pressed from the above-mentioned slide plate by a press machine, and thereafter, the ring members were rigidly bonded to the inner faces of the above-mentioned upper and lower casings by a conventional epoxy adhesive manufactured and sold by, e.g., Cemedyne Co., Ltd., of Japan under the trade name of HIGH SUPER, and thus upper and lower casings substantially corresponding to the upper and lower halves 20b and 20a of the casing 20 were obtained.

A magnetic recording disk corresponding to the disk 10 of FIG. 1 was subsequently prepared in the following manner. Namely, perpendicular magnetic layers of a 0.5 micron thick permalloy and of a 0.15 micron thick CoCr were applied to both faces of a 50 micron thick polyester film by the opposed target type sputtering method disclosed in, e.g., U.S. Pat. No. 4,407,894 to Kadokura et al., then a 200 Å thick protective layer of a Co oxide was applied to the upper CoCr perpendicular magnetic layer, and thus a sheet-like perpendicular magnetic recording medium was prepared. Thereafter, a 3.5 inch diameter disk was pressed from the sheet-like perpendicular magnetic recording medium, and an appropriate hub assembly as shown in FIG. 1 was fixedly attached to the pressed disk by a double sided adhesive tape, to obtain a sample disk corresponding to the magnetic recording disk 10 of FIG. 1. The sample disk was then assembled into the above-mentioned upper and lower casings to obtain a sample 3.5 inch magnetic recording disk cartridge according to the first embodiment of the present invention.

The sample 3.5 inch magnetic recording disk cartridge was then set in a conventional 3.5 inch flexible magnetic recording disk drive unit available on the market, and rotated at 600 r.p.m. to test the sliding condition between the magnetic recording disk 10 and the ring members 27a and 27b of the cartridge.

When the spacing between the upper ring member 27b attached to the upper casing 20b and the lower ring member 27a attached to the lower casing 20a was approximately 150 microns, the maximum fluctuation of the rotating magnetic recording disk 10 measured at the head windows of both casings 20a and 20b was 60 microns. From this test result, it was confirmed that, according to an aerodynamic operation occurring between the two ring members 27a and 27b, the fluctuation of the disk 10 was very small in comparison with the amount of spacing between the ring members 27a and 27b. The measured fluctuation of the disk 10 is shown in FIG. 5, in which the abscissa indicates a time for one complete revolution of the disk 10, and the ordinate indicates the amount of fluctuation of the disk 10. It should be noted that, when the magnetic recording disk 10 passes under the head window of the casing 20, the disk 10 is in sliding contact with only the magnetic recording/retrieving head, and therefore, the fluctuation of the disk 10 measured at the head windows directly affects the recording and retrieving operation of the magnetic recording/retrieving head.

Since the surface conditions of the peripheral portion of the disk 10 and both ring members 27a and 27b were unchanged when observed by the naked eye after a sliding test of ten millions passes, it was also confirmed that an undesirable sliding contact did not occur during the rotation of the disk 10.

The fluctuation of the magnetic recording disk 10 was measured by a photo-electric measuring device manufactured and sold by Suntechno Co., Ltd., of Japan under the trade name of Photonic sensor KD-340.

Figure 5:
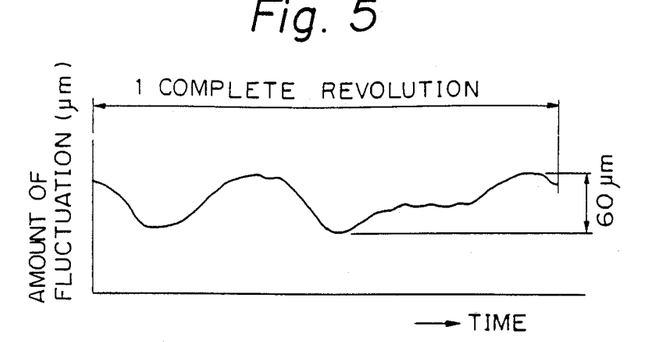
FIG. 5 is a graphic view illustrating a fluctuation of the magnetic recording disk measured when the disk is encased and rotated in the casing of the cartridge according to the first embodiment.
Figure 6:
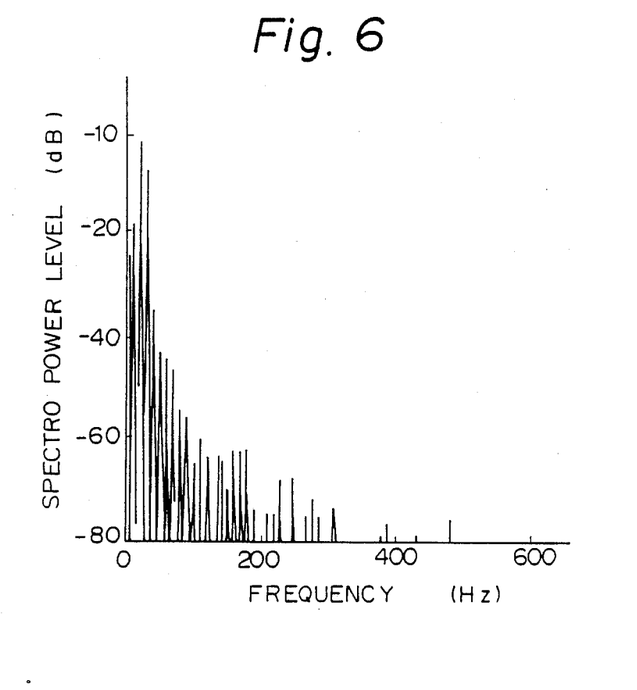
FIG. 6 is a graphic view illustrating the result of a frequency analysis of the fluctuation wave form of the magnetic recording disk incorporated in the cartridge according to the first embodiment.

FIG. 6 illustrates the results of the frequency analysis of the wave form of FIG. 5, carried out by a spectroanalyzer TR 4171 of Advantest Co., Ltd., of Japan. The abscissa of FIG. 6 indicates the frequency (Hertz), and the ordinate indicates a spectro power (dB). From the illustration of FIG. 6, it can be understood that the frequency band of the fluctuation of the disk 10 extends between zero to 500 Hz (10 Hz per one revolution of the disk rotating at 600 r.p.m.), and that the spectro power of the fluctuation of the disk 10 is smoothly attenuated in response to an increase of the frequency.

From the above test results, it was confirmed that the magnetic recording disk cartridge according to the first embodiment of the present invention effectively achieves an appropriate suppression of fluctuation of the magnetic recording disk during the rotation thereof.

On the other hand, when the above-mentioned sample magnetic recording disk 10 was assembled in the casing of a conventional 3.5 inch floppy disk jacket, and was subjected to the sliding test, it was found that, before the rotation of the disk reaches 3 million passes, dirt was detected on the overall area of both faces of the magnetic recording disk, and damage was detected on the faces of the disk after 5 million passes. Further, a large amount of fluctuation of the rotating magnetic recording disk of more than 300 microns was measured.

Also, the magnetic recording disk cartridge according to the first embodiment of the present invention indicated a good recording and retrieving characteristic; i.e., the retrieving wave form was appropriate and the envelope of the wave form was stable enough to realize a high quality magnetic recording disk cartridge.

Figure 3:
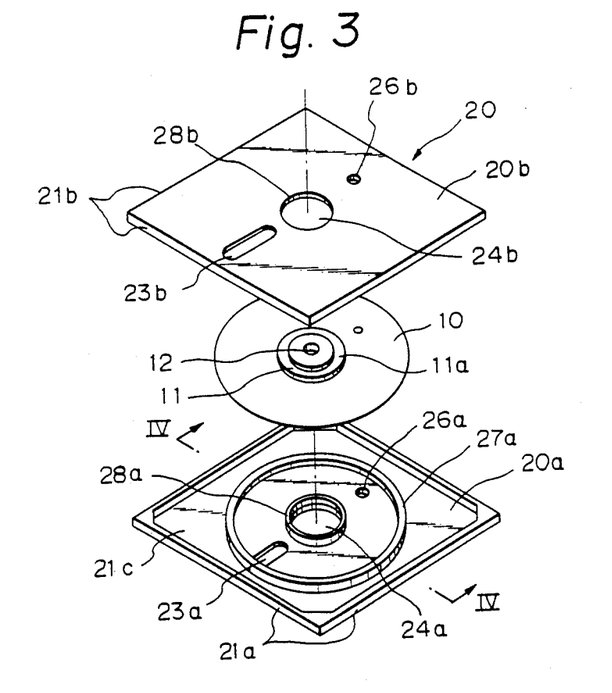
FIG. 3 is an exploded view of a magnetic recording disk cartridge according to a second embodiment of the present invention.
Figure 4:
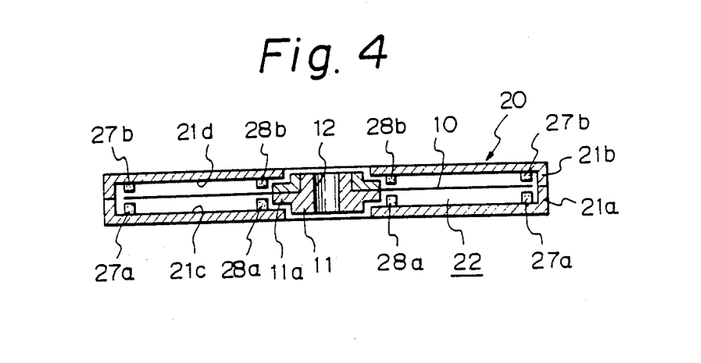
FIG. 4 is a cross sectional view taken along the line IV—IV of FIG. 3.

FIGS. 3 and 4 illustrate a magnetic recording disk cartridge according to a second embodiment of the present invention. The cartridge of FIGS. 3 and 4 is different from that of the first embodiment in that ring members for suppressing the fluctuation of the magnetic recording disk during the rotation thereof are disposed not only at an outer peripheral portion of the disk but also at an inner peripheral portion of the disk. It should be understood that, in FIGS. 3 and 4, elements and parts designated by the same reference numerals as used in FIGS. 1 and 2 are the same as those of the first embodiment.

In FIGS. 3 and 4, a pair of large fluctuation suppressing ring members 27a and 27b are arranged adjacent to the side walls 21a and 21b of the lower and upper halves 20a and 20b of the casing 20, and fixedly attached to the inner faces 21c and 21d of both halves 20a and 20b. The large ring members 27a and 27b confront the outer peripheral portion of the magnetic recording disk 10. Another pair of small fluctuation suppressing ring members 28a and 28b are arranged adjacent to central bores 24a and 24b of the lower and upper halves 20a and 20b, and fixedly attached to the inner faces 21c and 21d of both halves 20a and 20b. The small ring members 28a and 28b confront the inner peripheral portion of the magnetic recording disk 10, and the pair of small fluctuation suppressing ring members 28a and 28b are arranged to be coaxial with the large fluctuation suppressing ring members 27a and 27b. Accordingly, in the second embodiment of FIGS. 3 and 4, the bosses 25a and 25b of the first embodiment are eliminated. These small and large fluctuation suppressing ring members 27a, 27b, 28a, and 28b are made of an appropriate sliding material as stated before with respect to the ring members 27a and 27b of the first embodiment. Further, the confronting ends of these small and large rings 27a, 27b, 28a and 28b are preferably rounded to improve the sliding characteristic between these ring members and the magnetic recording disk 10. The other construction and arrangement of the second embodiment of FIGS. 3 and 4 are the same as those of the first embodiment of FIGS. 1 and 2.

The operational effects of the magnetic recording disk cartridge provided with the casing 20 and the small and large fluctuation suppressing ring members 28a, 28b, 27a and 27b according to the second embodiment will now be described, on the basis of a test conducted to confirm the effects.

First, the upper and lower casings of a conventional 3.5 inch floppy disc cartridge available in the market were used for preparation of the afore-mentioned casing 20 with upper and lower halves 20b and 20a. The inner faces of the upper and lower casings of the conventional cartridge were made flat by machining and the liners and lifters were removed, and thus upper and lower casings substantially corresponding to those shown in FIG. 3 were obtained.

Subsequently, small and large fluctuation suppressing ring members were prepared by using a 0.50 mm thick carbon plate manufactured and sold by Tohoku Kyowa Carbon Co., Ltd., of Japan under the trade name of METHAPHITE. The small ring members 28a and 28b were plate-like annular members having an inner diameter of 35 mm and an outer diameter of 43 mm, and the large ring members 27a and 27b were plate-like annular members having an inner diameter of 80 mm and an outer diameter of 88 mm. Thereafter, these small and large ring members 28a, 28b, 27a, and 27b were rigidly bonded to the inner faces of the above-mentioned upper and lower casings by using a conventional epoxy adhesive manufactured and sold by, e.g., Cemedyne Co., Ltd., of Japan under the trade name of HIGH SUPER, and thus upper and lower casings substantially corresponding to the upper and lower halves 20a and 20b of the casing 20 of FIGS. 3 and 4 were obtained.

A magnetic recording disk corresponding to the disk 10 of FIG. 3 was subsequently prepared in the following manner. Namely, perpendicular magnetic layers of a 0.5 micron thick permalloy and of a 0.15 micron thick CoCr were applied to both faces of a 50 micron thick polyester film by opposed target type sputtering, then a 200 Å thick protective layer of a Co oxide was applied to the upper CoCr perpendicular magnetic layer, and thus a sheet-like perpendicular magnetic recording medium was prepared. Thereafter, a 3.5 inch diameter disk was pressed from the sheet-like perpendicular magnetic recording medium, and an appropriate hub assembly as shown in FIG. 3 was fixedly attached to the pressed perpendicular magnetic recording disk by a double sided adhesive tape, to obtain a sample disk corresponding to the magnetic recording disk 10 of FIG. 3. The sample disk was then assembled into the above-mentioned upper and lower casings to obtain a sample 3.5 inch magnetic recording disk cartridge according to the second embodiment of the present invention.

The sample 3.5 inch magnetic recording disk cartridge was then set in a conventional 3.5 inch flexible magnetic recording disk drive unit available in the market, and rotated at 600 r.p.m. to test the sliding condition between the magnetic recording disk 10 and the small and large fluctuation suppressing ring members 28a, 28b, 27a, and 27b of the cartridge.

Figure 7:
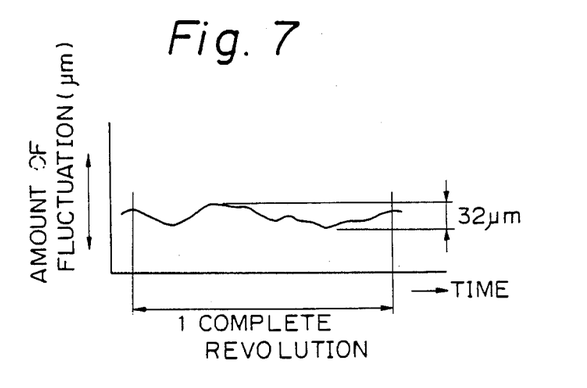
FIG. 7 is a graphic view illustrating a fluctuation of the magnetic recording disk measured when the disk is encased and rotated in the casing of the magnetic recording disk cartridge according to the second embodiment.

When the spacing between the small and large ring members 28b and 27b attached to the upper casing 20b and the small and large ring members 28a and 27a attached to the lower casing 20a was approximately 150 microns, the maximum fluctuation of the rotating magnetic recording disk 10 measured at head windows of both casings 20a and 20b was 32 microns. From this test result it was confirmed that, according to an aerodynamic operation occurring between the ring members 28a, 28b, 27a, and 27b, the fluctuation of the disk 10 was very small in comparison with the amount of spacing between the ring members. The measured fluctuation of the disk 10 is shown in FIG. 7, in which the abscissa indicates a time for one complete revolution of the disk 10, and the ordinate indicates the amount of fluctuation of the disk 10. It should be noted that, when the magnetic recording disk 10 passes under the head window of the casing 20, the disk 10 is in sliding contact with only the magnetic recording/retrieving head, and therefore, fluctuation of the disk 10 measured at the head windows will directly affect the recording and retrieving operation of the magnetic recording/retrieving head.

Since the surface conditions of the peripheral portion of the disk 10 and the ring members 28a, 28b, 27a and 27b were unchanged when observed by the naked eye after a sliding test of ten million passes, it was also confirmed that, during the rotation of the disk 10, an undesirable sliding contact did not occur. The measurement of the fluctuation of the magnetic recording disk was carried out by the same photoelectric measuring device as used in the test of the first embodiment.

Figure 8:
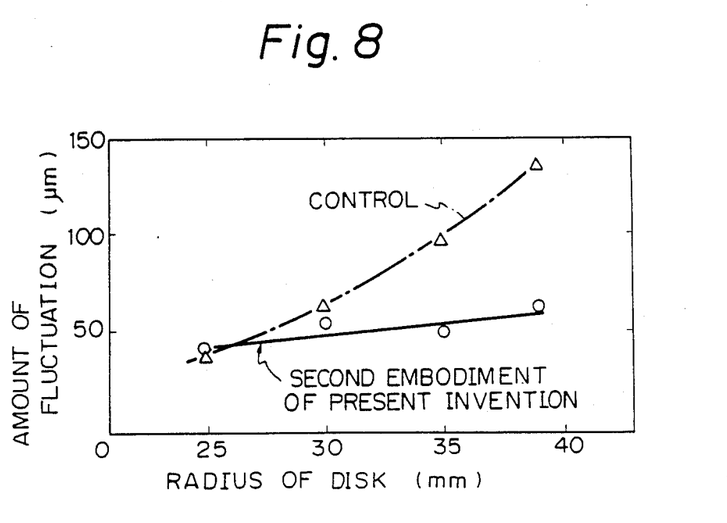
FIG. 8 is a graphic view illustrating a maximum fluctuation at various positions along a radius of the magnetic recording disk of the cartridge according to the second embodiment, and of a magnetic recording disk used as a control.

FIG. 8 illustrates the result of a comparison of the fluctuation of the magnetic recording disk between the control disk, in which the disk was assembled in a conventional casing provided with conventional nonwoven cloth liners, and the second embodiment in which the disk with a conventional hub attached thereto was assembled in the casing provided with the above-mentioned small and large fluctuation suppressing ring members. The fluctuations of the disk in both cases, as shown in FIG. 8, were the maximum amount of fluctuation at various points along the radius of the disk.

From FIG. 8, it will be readily understood that, according to the second embodiment of the present invention, the maximum amount of fluctuation of the magnetic recording disk was substantially constant at each measuring position along the radius of the disk.

On the other hand, in the case of the control, it will be understood that the maximum amount of fluctuation of the disk increased at each measuring position, from the center of the outer periphery of the disk along the radius thereof. When the amount of fluctuation of the disk during the rotation thereof is large, a constant contact between the magnetic recording disk and a magnetic recording/retrieving head cannot be obtained, and a large impact will be applied to the magnetic head, making it difficult to obtain a reliable recording and retrieving operation of the magnetic head.

Figure 9A:
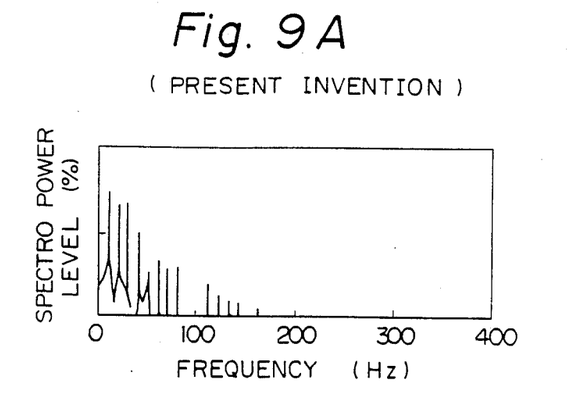
FIGS. 9A and 9B are graphic views illustrating the results of a frequency analysis of the fluctuation waves of the rotating magnetic recording disk of the cartridge according to the second embodiment, and that of the control disk.
Figure 9B:
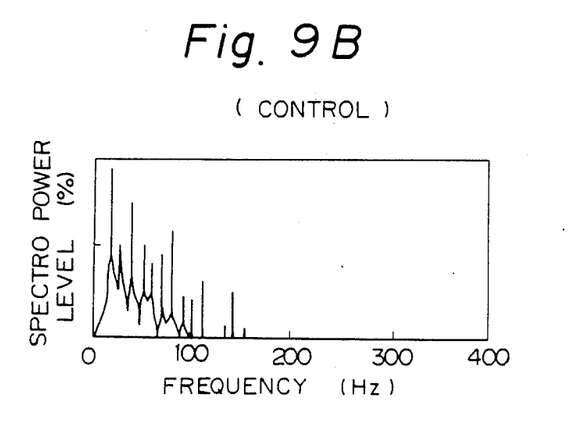

FIGS. 9A and 9B illustrate the results of a frequency analysis of the wave forms of the fluctuations of the magnetic disk at the position of 35 mm in FIG. 8, with respect to the second embodiment of the present invention and the control. In FIGS. 9A and 9B, the abscissa of the respective graphs indicates a frequency, and the ordinate indicates a relative spectro power level (%). The frequency analysis of the wave forms was carried out by the same spectroanalyzer as that used in the first embodiment.

FIG. 9A indicates the case of the second embodiment of the present invention, and FIG. 9B indicates the case of the control.

From a comparison of FIGS. 9A and 9B, it will be understood that the frequency band of the fluctuation of the magnetic recording disk extends between 0 and 200 Hertz in both cases, and that the characteristic of the frequency analysis of the present invention is comparable with that of the control employing the conventional nonwoven cloth liners.

From the test results above, it was confirmed that the magnetic recording disk cartridge according to the second embodiments of the present invention effectively achieves an appropriate suppression of fluctuation of the magnetic recording disk during the rotation thereof.

When the above-mentioned sample magnetic recording disk 10 was assembled in the casing of a conventional 3.5 inch floppy disk jacket, and was subjected to the sliding test, it was found that, before the rotation of the disk reaches 3 million passes, dirt was detected on the overall area of both faces of the magnetic recording disk, and damage was detected on the faces of the disk after 5 million passes.

Also, the magnetic recording disk cartridge according to the second embodiment of the present invention indicated a good recording and retrieving characteristics. Namely, the retrieving wave form was appropriate, and the envelope of the wave form was stable enough to realize a high quality magnetic recording disk cartridge.

Figure 10A:
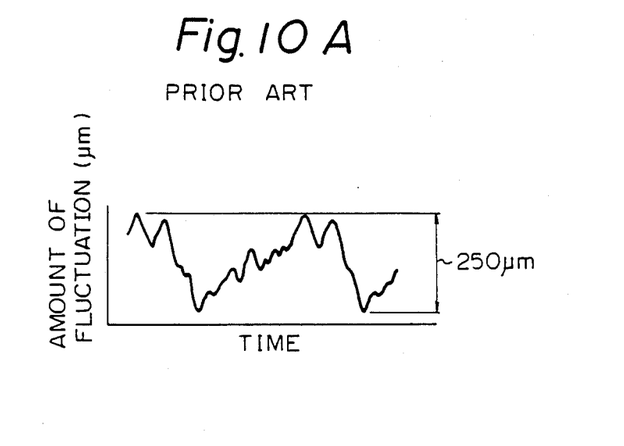
FIGS. 10A and 10B are graphic views illustrating the amount of fluctuation of a 3.5 inch flexible magnetic recording disks with a Co-Cr alloy magnetic recording layer, encased and rotated in two different casings, i.e., a casing with a plurality of hard projections or pads, and a casing with a stationary fluctuation suppressing means.
Figure 10B:
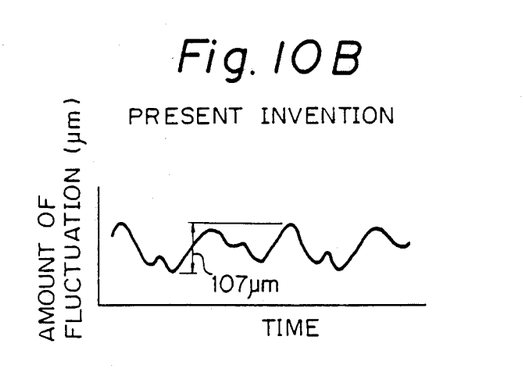

FIGS. 10A and 10B illustrate comparative test results of fluctuations of a 3.5 inch flexible magnetic recording disk having a Co-Cr alloy system magnetic recording layer incorporated in both a hard cartridge casing with a plurality of hard pads as disclosed in the afore-mentioned Japanese Unexamined Patent Publication No. 62-33385 and a hard casing with the fluctuation suppressing ring members according to the present invention.

When the 3.5 inch flexible magnetic recording disk having a Co-Cr alloy system magnetic recording layer was inserted in the hard casing with the hard pads arranged to confront an outer peripheral portion of each face of the disk, and was subjected to recording and retrieving tests, it was found that disturbance appeared in a wave form of a retrieving signal. According to the investigation by the inventors, it was found that the sliding condition between the magnetic recording disk and a magnetic recording/retrieving head changes in accordance with an extent of fluctuation of the disk measured when the head is not in contact with the disk face. Namely, the fluctuation of the disk, which is dynamically induced due to the rotation of the disk, caused stress spots on both the disk face and the recording/retrieving end of the head, and therefore, an uncontrolled gap appeared between the face of the disk and the head, resulting in the occurrence of disturbances in the wave form of the retrieving signal. In conclusion, it was found that, in the 3.5 inch flexible magnetic recording disk, since a radial distance between the center axis of the disk about which the disk is rotated and the end of the magnetic recording/retrieving head is small compared with that of a 5¼ inch magnetic recording disk, the spacing between an end in contact with the magnetic head and the disk face is easily varied in accordance with an extent of the fluctuation of the magnetic recording disk from a flat plane during the rotation thereof. Further, it was found that, according to the arrangement of the hard projections or pads adjacent to the peripheral portion of the magnetic recording disk, suppression of a fluctuation of the disk in the area of head windows of a cartridge casing is relatively difficult.

As illustrated in FIGS. 10A and 10B, it was found by experiment that the fluctuation of the above-mentioned 3.5 inch flexible magnetic recording disk with a Co-Cr alloy magnetic recording layer when the disk was incorporated in the hard casing with fluctuation suppressing rings of the present invention is definitely smaller than that of the same disk incorporated in the hard casing with the hard projections of the prior art. Although the maximum fluctuation of the disk of the prior art during the rotation thereof through one complete revolution is 250 microns, the maximum fluctuation of the disk of the present invention during the rotation thereof through one complete revolution can be reduced to 107 microns. In addition, from a comparison of the wave forms of the fluctuation of FIGS. 10A and 10B, it can be understood that the suppression of fluctuation in the present invention can be carried out more smoothly than in the prior art.

Figures 11, 12:
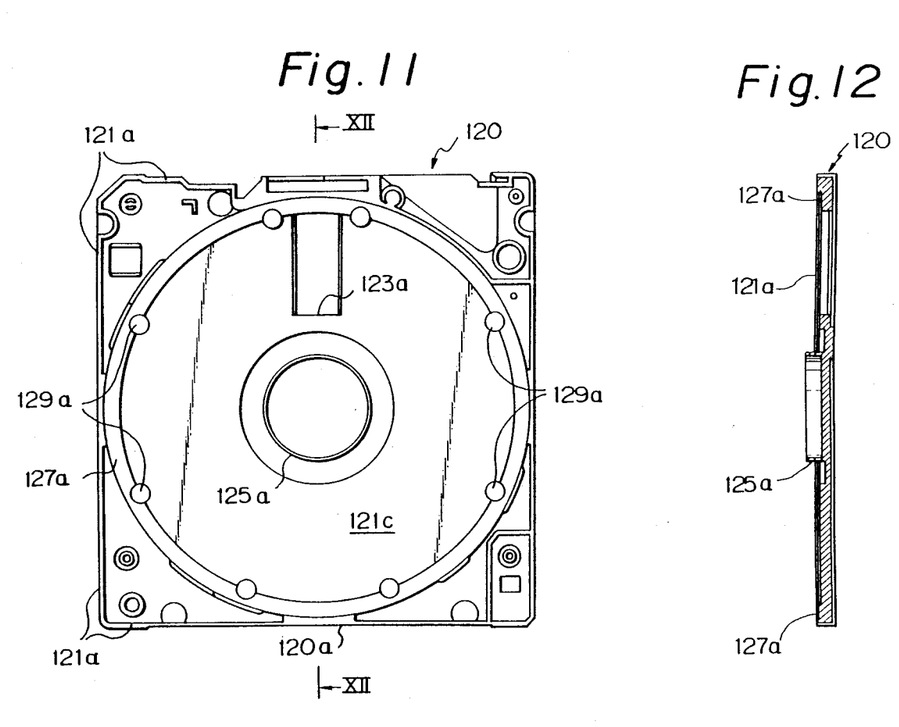
FIG. 11 is a plan view of a half of a casing of a magnetic recording disk cartridge according to a third embodiment of the present invention.
FIG. 12 is a cross-sectional view taken along the line XII—XII of FIG. 11.
Figure 13:
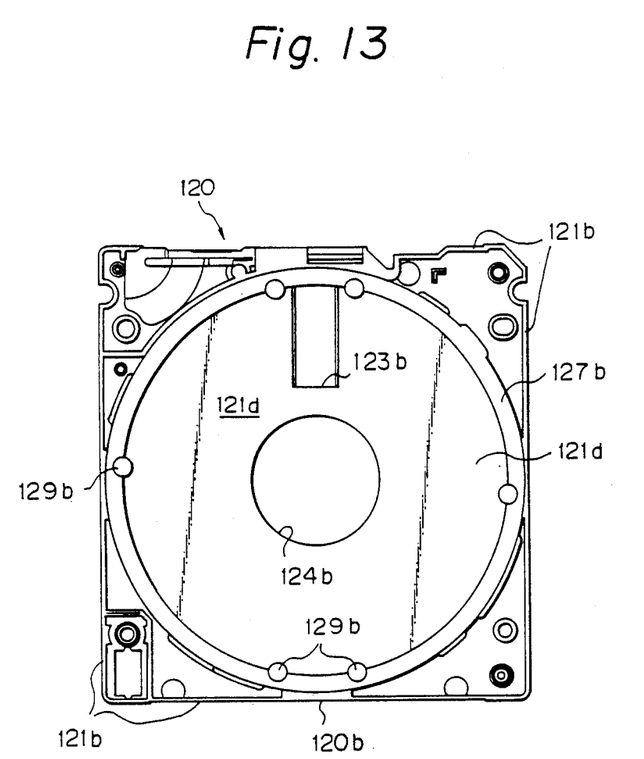
FIG. 13 is a plan view of another half of a casing of the cartridge of the third embodiment.

FIGS. 11 through 13 illustrate a casing of a magnetic recording disk cartridge according to a third embodiment of the present invention.

The casing of the third embodiment of the present invention, i.e., a 3.5 inches hard casing 120, was made of an ABS resin (acrylonitride butadiene styrene resin) by die casting employing metallic dies. FIG. 11 is a plan view showing the inner construction of one half 120a of the casing 120, and FIG. 13 is a plan view showing the inner construction of the other half 120b of the casing 120. Both halves 120a and 120b of the casing 120 are mated together when a magnetic recording disk cartridge incorporating therein a magnetic recording disk (not shown) is assembled. The halves 120a and 120b are provided with openings 123a and 123b for the head window of the assembled casing 120, at a predetermined position. The half 120a of FIG. 11 is provided with a central boss 125a for rotatably positioning the magnetic recording disk with a central hub, side walls 121a, and an inner face 121c, and the half 120b of FIG. 13 is provided with a central bore 124b through which a drive shaft of a magnetic recording disk cartridge drive unit is inserted into a drive-hole of the magnetic recording disk, side walls 121b, and an inner face 121d.

Both halves 120a and 120b are integrally provided with coaxial annular raised portions 127a and 127b at radially outer portions of the inner faces 121c and 121d.

The annular raised portions 127a and 127b have a radial width of 3 mm, respectively, and axial heights from the bottom such that a 0.1 mm spacing remains between the ends of the portions 127a and 127b when both halves 120a and 120b are mated together to form the box-like casing 120.

A plurality of circular raised portions 129a and 129b arranged along the annular raised portions 127a and 127b are residues used for removing the respective halves 120a and 120b from the corresponding metallic dies at the final stage of the die casting process. Namely, by pressing these circular raised portions 129a and 129b with pressing rods, the cast ABS resin halves 120a and 120b can be taken out of the metallic dies without causing deformation of the halves 120a and 120b, and therefore, these circular raised portions 129a and 129b are very important for the production of accurate halves 120a and 120b of the casing 120. On the other hand, these residues 129a and 129b do not adversely affect the operation of the annular raised portions 127a and 127b or the encasing function of the casing 120. It should be understood, however, that, in the case of a die casting of a plastic product having a small thickness by using metallic dies, the shape and dimensions of the product are often affected by the material properties of the plastic material used, such as a viscoelasticity of the material, and diverse conditions under which the plastic material is injected into the metallic dies, and therefore, the shape and dimensions of the annular raised portions 127a and 127b may be varied without departing from the technical concept of the present invention.

The above-mentioned halves 120a and 120b were then subjected to a sputtering process to apply a hard coating to the surface of the annular raised portions 127a and 127b by using an rf sputtering apparatus (a sputtering apparatus type SBH-5110 made by Nippon Shinku Co., Ltd., of Japan). When the sputtering was carried out, the entire inner surfaces of both halves 120a and 120b except around the annular raised portions 127a and 127b were covered with a glass plate, to mask them from the sputtering. The sputtering process was carried out as follows:

The apparatus was brought to a vacuum condition of a back pressure of $1 \times 10^{-5}$ Torr, and an Ar gas containing 30% $N_2$ gas was introduced into the apparatus. Then, SiNx ($0 < X < 2$) was sputtered on the surface of the annular raised portions 127a and 127b of the two halves 120a and 120b under a sputtering pressure of $2.5 \times 10^{-3}$ Torr, and a 300 Å/min depositing speed. The thickness of the sputtered SiNx coating was 500 Å. The target used for the sputtering operation was an Si metal target.

In the other sputtering process, an SiAl alloy target was used instead of the above-mentioned Si metal target, and thus a 600 through 700 Å thick Si ($0.5 < X < 1.5$; $0.2 < y < 0.5$) protective coating was sputtered on the surface of the annular raised portions 127a and 127b of the two halves 120a and 120b under the same sputtering condition as that for the above mentioned SiNx coating. Accordingly, the annular raised portions 127a and 127b of the two halves 120a and 120b were formed in the ring-form fluctuation suppressing means according to the present invention. Subsequently, a magnetic recording disk having an $SiC_X$ (X: 80–97 at %) protective layer produced by an opposed target type sputtering apparatus employing a composite type carbon target having Si placed thereon and a conventional hub member was assembled in the casing 120 consisting of the above-mentioned two halves 120a and 120b, and set in a conventional 3.5 inches disk drive unit to carry out a fluctuation suppression test and a life test. The magnetic recording disk was rotated at 600 r.p.m. It should be noted that the tests were carried out by using a photo-electric measuring device similar to that used for the test of the first embodiment. As a result of these tests, the fluctuation of the magnetic recording disk was always less than 70 microns, and no damage was detected on the surfaces of the magnetic recording disk or the ring-form fluctuation suppressing means after a rotation of the disk exceeding ten million passes.

From the foregoing description of the preferred embodiments of the present invention, it will be understood that the magnetic recording disk cartridge according to the present invention exhibits a reliable and high quality recording and retrieving performance for a long operation life. Also, the cartridge of the present invention can be used with a magnetic recording disk with a high hardness magnetic recording layer, such as perpendicular magnetic recording layer, and therefore, a novel magnetic recording disk cartridge having a high recording density can be realized.

We claim:

1. A magnetic recording disk cartridge comprising:
   a rigid casing means having first and second inner faces confronting one another, and a planar spacing defined between said first and second inner faces;
   a magnetic recording disk encased in said planar spacing of said rigid casing means to be rotatable about an axis perpendicular to said first and second inner faces of said rigid casing means; and
   a stationary ring-form means for aerodynamically maintaining said magnetic recording disk at an axially middle position of said planar spacing of said rigid casing means when said magnetic recording disk is rotated in said planar spacing, said stationary ring-form means being made of a sliding material and comprising at least a pair of first and second rings arranged within the rigid casing means to confront at least an outer peripheral portion of the magnetic recording disk from both sides thereof, to thereby aerodynamically suppress fluctuation of said magnetic recording disk during the rotation thereof.

2. A magnetic recording disk cartridge according to claim 1, wherein said stationary ring-form means further comprises another pair of third and fourth rings arranged within said rigid casing means to confront a centrally peripheral portion of said magnetic recording disk from both sides thereof, said third and fourth rings being disposed coaxially with said first and second rings within said casing means.

3. A magnetic recording disk cartridge according to claim 2, wherein said third and fourth rings are each an endless annular ring.

4. A magnetic recording disk cartridge according to claim 3, wherein said annularly extending member has a rounded end confronting faces of said magnetic recording disk.

5. A magnetic recording disk cartridge according to claim 1, wherein said first and second rings of said ring-form means are separate members, respectively, bonded to said first and second inner faces of said rigid casing means.

6. A magnetic recording disk cartridge according to claim 1, wherein said first and second rings of said ring-form means are formed integrally with said casing means and coated with a layer of a sliding material.

7. A magnetic recording disk cartridge according to claim 6, wherein said casing means with said integrally formed first and second rings comprises as upper casing provided with said first ring and a lower casing provided with said second ring, said upper and lower casings being formed by a die casting of a plastic material, respectively, to be capable of being mated together, and provided with a plurality of raised portions formed as residues arranged to be even with and adjacent to said first and second rings.

8. A magnetic recording disk cartridge according to claim 1, wherein said sliding material of said ring-form means comprises a carbon system sliding material.

9. A magnetic recording disk cartridge according to claim 8, wherein said first and second rings of said ring-form means are annular rings pressed from a plate made of said carbon system sliding material.

10. A magnetic recording disk cartridge according to claim 1, wherein said magnetic recording disk comprises a thin-film type flexible magnetic recording disk.

11. A magnetic recording disk cartridge according to claim 10, wherein said thin-film type flexible magnetic recording disk has a magnetic recording layer on each face thereof.

12. A magnetic recording disk cartridge according to claim 1, wherein said magnetic recording disk comprises a thin-film type flexible magnetic recording disk having a protective layer of $SiC_X$ on a face thereof, where X: 80 through 97 at%.

13. A magnetic recording disk cartridge according to claim 1, wherein said magnetic recording disk comprises a thin-film type flexible magnetic recording disk having a protective layer of a metallic oxide on a face thereof.

14. A magnetic recording disk cartridge according to claim 13, wherein said sliding material of said ring-form means comprises a high hardness ceramics.

15. A magnetic recording disk cartridge according to claim 14, wherein said high hardness ceramics comprises zirconium systems ceramics.

16. A magnetic recording disk cartridge according to claim 14, wherein said high hardness ceramics comprises an alumina system ceramics.

17. A magnetic recording disk cartridge according to claim 14, wherein said high hardness ceramics comprises a titanium system ceramics.

18. A magnetic recording disk cartridge according to claim 14, wherein said high hardness ceramics comprises a silicon system ceramics.

19. A magnetic recording disk cartridge according to claim 1, wherein said high hardness ceramics of said sliding material has a Vickers hardness of more than 1000.

20. A magnetic recording disk cartridge according to claim 1, wherein said sliding material of said ring-form means comprises a tungsten carbon composite material.

21. A magnetic recording disk cartridge according to claim 1, wherein said sliding material of said ring-form means comprises an aluminum nitride material.

22. A magnetic recording disk cartridge according to claim 1, wherein said sliding material of said ring-form means comprises a glassy carbon material.

23. A magnetic recording disk cartridge according to claim 1, wherein said casing means comprises upper and lower halves having substantially a same inner construction thereof, said upper half having said first inner face, and said lower half having said second inner face.

24. A magnetic recording disk cartridge according to claim 1, wherein said first and second rings are each an endless annular ring.

25. A magnetic recording disk cartridge according to claim 1, wherein each of said first and second rings of said ring-form means is formed as an annularly extending member having a predetermined radial width thereof.

* * * * *